United States Patent Office

2,992,935
Patented July 18, 1961

2,992,935
RESINS AND METHODS OF THEIR PRODUCTION
Nathaniel M. Winslow, 2115 Riverside Drive,
Cleveland, Ohio
No Drawing. Filed Feb. 17, 1959, Ser. No. 793,707
50 Claims. (Cl. 106—284)

This application relates to resins and, more particularly, to hydrocarbonaceous resins and methods of their production.

This application is a continuation-in-part of copending applications Serial No. 564,110, filed February 8, 1956, and Serial No. 623,549, filed November 21, 1956, both now abandoned.

An object of this invention is to provide a new class of hydrocarbonaceous resinous materials which may be produced economically, which are relatively inert chemically, and which are highly resistant to physical and chemical changes at elevated temperatures.

The production of known resins entails the utilization of relatively expensive reactants. For example, the production of phenol-aldehyde resins involves the use of phenol as a starting material. Phenol is obtained either by separation from a rather complex starting mixture or is manufactured by an independent chemical process and, as a result, is too expensive a component for the production of low cost resins. Although phenol-aldehyde resins are among the cheapest of the known resins, they are too expensive for many uses. Accordingly, there is a need for a relatively low cost thermoset resin which possesses resistance to chemicals and which, in addition, remains substantially unaltered when subjected to elevated temperatures.

In accordance with this invention, hydrocarbonaceous resinous materials are provided from which thermosetting and thermoset resinous compositions may be produced and from which thermoplastic resins which are not thermosetting are also produced, all of said resins being relatively inert chemically and resistant to deterioration at elevated temperatures. In fact, they possess a markedly increased chemical inertness and heat stability over the significantly more expensive phenol-aldehyde resins.

The chemical inertness of the cured, essentially hydrocarbonaceous resinous materials is evidenced by their having an Adams' resistance rating of at least 90 when treated with 20% sodium hydroxide at 100° C. The resinous materials are solid at 25° C., have less than 35% benzene-soluble components, and manifest no fluidity at 375° C. They yield a carbon residue of at least 65% and substantially less than 100% by weight when heated at 950° C. in the absence of oxygen.

The thermoset resinous compositions of this invention may be produced by heating a partially cured, essentially hydrocarbonaceous resinous material which is thermosetting, solid at 25° C., and has 25 to 60% of benzene-soluble components. Preferably, the thermosetting resins have a draw point within the range of 200° and 260° C. and benzene-soluble components of 35 to 45%. The heating of the hydrocarbonaceous, thermosetting resin is conducted at a temperature between 165° and 400° C. and is continued until the thermosetting resin is converted into a substantially infusible thermoset resin. The thermoset stage is indicated by the resinous material not manifesting fluidity when heated to 375° C. Within the broad range of 165° and 400° C. for the heating, the thermosetting resin may be heated at a temperature between 250° and 350° C., preferably between 275° and 325° C., and most desirably at about 300° C. The heating is continued until the thermosetting resin is converted into a substantially infusible thermoset resin.

The partially cured, essentially hydrocarbonaceous thermosetting resinous material used for the production of the thermoset resinous compositions of this invention may be prepared by mixing a hydrocarbonaceous pitch, more particularly later described, with an oxidizing agent, such as a dinitrobenzene, and heating the mixture within the range of 165° to 400° C. until the reaction product has a draw point within the range of 150°–275° C. and contains 25% to 60% of benzene-soluble components. For example, the mixture of the hydrocarbonaceous pitch and the oxidizing agent may be heated at a temperature within the range of 185° to 250° C. until the reaction mixture has a draw point within the range of 175° to 250° C. and contains 35% to 45% of benzene-soluble components. A convenient procedure is to heat the mixture of the hydrocarbonaceous pitch and the oxidizing agent to a temperature within the range of 165° and 275° C. without excessive foaming, and continuing the heating until the rate of cure of the mixture decreases upon further heating. Desirably, the heating is continued until the rate of increase of the draw point of the reaction product is less than 3° C. per hour while temperature is maintained substantially constant. One most desirable procedure is to start heating the mixture of pitch and oxidizing agent at 165–180° C. and then to increase the temperature within the range of 200–250° C. at a rate sufficiently slowly to avoid excessive foaming of the reaction mixture, and finally continuing the heating until the draw point of the reaction product is within the range of 150° to 275° C.

It is essential that the hydrocarbonaceous pitches used as starting materials for the production of the thermoset compositions of this invention, as well as for the partially cured thermosetting resins employed for the production of such thermoset compositions, have the following characteristics: Solid, semi-solid or viscous liquid materials, essentially hydrocarbon in nature and susceptible to softening, melting or lowering of viscosity on application of heat, which (a) have at 25° C. a specific gravity of 1.02 or greater referred to water at 4° C., and (b) when heated for 72 hours at 450° C., in a closed vessel where distillation is not possible, will yield at least 60%, based on the weight of the pitch so heated, of solid material which, on further heating to 950° C. at atmospheric pressure but in the absence of oxygen, will yield a carbon residue amounting to at least 80% of the solid product from the pitch.

The thermosetting hydrocarbonaceous materials of this invention are partially cured, solid at 25° C., have a draw point within the range of 150°–275° C. and have 25% to 60% benzene-soluble components. Preferably, the thermosetting materials have a draw point within the range of 200–250° C. and have benzene-soluble components of 35% to 45%. Desirably, for many purposes, the thermosetting hydrocarbonaceous material is incorporated in a molding composition containing a filler, such as asbestos. Preferably, such molding composition manifests at 300° C. plasticity when subjected to 500 lbs. per square inch pressure, manifests no significant plasticity when subjected to 5 lbs. per square inch pressure, and evolves no significant amounts of gaseous products when completely cured.

A convenient method of ascertaining plasticity of the precured thermosetting molding composition at 300° C. is by subjecting one disc of the material to be tested at 300° C. to a pressure of 5 pounds per square inch and another disc of the same material at 300° C. to a pressure of 500 lbs. per square inch. Conveniently, the discs have a cross-sectional area of about four square inches and a thickness of about three-eighths inch. The discs are formed by compacting at room temperature the material to be tested in a circular mold at about 2000 lbs. pressure per square inch. One of the discs is placed between the platens of a molding press which has been brought to a temperature of 300° C. A pressure of 5 lbs. per square inch is then applied as quickly as possible thereafter, and the flow of the material in the disc is determined by the change in the thickness during a ten-minute period under the 5 lbs. per square inch pressure. The precured thermosetting composition should not manifest any significant plasticity at 5 lbs. per square inch pressure.

A similar disc of the material is then inserted between the platens, maintained at 300° C. and a pressure of 500 lbs. per square inch is rapidly applied to the disc. Plasticity again is determined by the change in thickness of the disc. The precured thermosetting composition should manifest significant plasticity at 500 lbs. per square inch pressure.

The partially cured, essentially hydrocarbonaceous thermosetting resinous material of this invention may be prepared by mixing a hydrocarbonaceous pitch, more particularly later described, with an oxidizing agent, such as a dinitrobenzene, and heating the mixture within the range of 165–400° C. until the reaction product has a draw point within the range of 150–275° C. and contains 25–60% of benzene-soluble components. For example, the mixture of the hydrocarbonaceous pitch and the oxidizing agent may be heated at a temperature within the range of 185–250° C. until the reaction mixture has a draw point within the range of 175–250° C. and contain 35–45% of benzene-soluble components. A convenient procedure is to heat the mixture of the hydrocarbonaceous pitch and the oxidizing agent to a temperature within the range of 165–275° C. without excessive foaming, and continuing the heating until the rate of cure of the mixture decreases upon further heating. Desirably, the heating is continued until the rate of increase of the draw point of the reaction product is less than 3° C. per hour while the temperature is maintained substantially constant.

One most desirable procedure is to start heating the mixture of pitch and oxidizing agent, such as polynitrobenzene, at 165–180° C. and then to further heat to a temperature within the range of 200–250° C. at a rate sufficiently slow to avoid excessive foaming of the reaction mixture, and finally continuing the heating until the draw point of the reaction product is within the range of 150–275° C. Again, the partially cured thermosetting resin may be produced by heating the hydrocarbonaceous pitch with an oxidizing agent starting at about 185° C. and going to temperatures within the range of 200–225° C. The temperature is raised at a rate sufficiently slow to avoid foaming, and the heating is continued until the draw point of the reaction product is within the range of 150–275° C., and preferably within the range of 175–250° C.

It is essential that the hydrocarbonaceous pitches used as starting materials for the production of the thermosetting compositions of this invention have the following characteristics: Solid, semi-solid or viscous liquid materials, essentially hydrocarbon in nature and susceptible to softening, melting or lowering of viscosity on application of heat, which (a) have at 25° C. a specific gravity of 1.02 or greater referred to water at 4° C., and (b) when heated for 72 hours at 450° C., in a closed vessel where distillation is not possible, will yield at least 60%, based on the weight of the pitch to heated, of solid material which, on further heating to 950° C. at atmospheric pressure but in the absence of oxygen, will yield a carbon residue amounting to at least 80% of the solid product from the pitch.

Of the pitches presently available on the market, the class useful in the invention comprises chiefly the coal tar pitches. However, some pitches within the class have been produced from other sources, notably mineral oil pitches, or petroleum pitches. Some coal tars, particularly the refined coal tars, also are included within the class useful for the practice of this invention. Also included are hydrocarbon compounds which fall within the class of hydrocarbonaceous pitches defined above. Materials which will not meet the above requirements for hydrocarbonaceous pitches are most of the asphalts, both manufactured and natural, wood pitch, and saponifiable pitches, such as stearine, wool grease, and bone pitches.

Perhaps the most useful compositions of this invention are molding compositions comprising a filler and a partially cured, essentially hydrocarbonaceous thermosetting resinous material. Such molding compositions are useful in the production of molded articles by subjecting the molding compositions to super-atmospheric pressure, such as pressures of 1,000 to 4,000 pounds per square inch and to temperatures between 250° and 350° C., until the partially cured resinous materials are converted into substantially infusible thermoset resins.

The molding compositions of this invention are produced from the partially cured, essentially hydrocarbonaceous resin material, which is thermoplastic and may or may not be thermosetting, solid at 25° C., although resins of a wider range of draw point may be used, resins having draw points within the range of 150–275° C., and having 25% to 60% benzene-soluble components are particularly desirable. Such partially cured resinous material is mixed with a filler and other components, if desired.

The mixture comprising the partially cured resin and filler may be used as a molding composition. Preferably, for many purposes, a precure, short of complete cure, is effected to disperse the partially cured resinous material over the surface of the filler and to eliminate a large portion of the gas which would be evolved in the complete cure of the resin, were such precure not effected.

For effecting such precure, the mixture is heated to a temperature in the range of 165–400° C. for a period sufficient to effect a further cure of the resinous material, but insufficient to convert it into an infusible thermoset resin. Desirably, the mixture is heated to a temperature above the draw point of the partially cured resinous material to cause it to flow, but without converting it into an infusible thermoset resin. Preferably, the heating of the mixture is continued for a period sufficient to increase substantially the cure of the resinous material to an extent that it may be later completely cured without significant evolution of gas.

Thermoset compositions are produced from the thermosetting hydrocarbonaceous materials of this invention by heating at a temperature of 250° to 350° C. and continuing the heating until the thermosetting material is converted into a substantially infusible thermoset composition. This conversion is effected regardless of whether or not the thermosetting material is admixed with other components, such as fillers, or whether or not such material is contained in a precured molding composition. If the thermosetting resinous material is contained in a precured molding composition, it is desirable to effect the complete cure at a lower temperature than that of the precure heating.

Thermoplastic resins formed in accordance with this invention may be those having no draw point, yet fusible between 275° and 400° C. Furthermore, such thermoplastic resins may have draw points between 150° C. and 275° C., but are potentially useful if they are low draw points, as, for example, 150° C.–165° C. Such resins at relatively low temperatures, because of their fluidity, are useful in connection with cellulosic fibrous fillers.

Thermoplastic resins of the invention may be formed by the reaction of pitch with a quantity of oxidizing agent which is insufficient in amount to bring about complete thermosetting. Such resins are therefore not thermosetting. On the other hand, thermosetting resins in which the oxidizing agent is not completely reacted and which are only partially cured are also thermoplastic. In either case the thermoplastic resins are only partially cured as contrasted with thermoset resins and are particularly useful in molding compositions.

Molding compositions containing the thermoplastic resins and a filler may be formed into hard molded products by conventional molding techniques used for thermoplastic resins, such as injection molding, compression molding, extrusion, etc. One important practical advantage of thermoplastic resins is that the time required for molding is only that required for heat transfer. Since no curing occurs in the molding operation, no time therefore would be allowed for curing. Accordingly valuable press time is saved in the molding operation.

Thermoplastic resins having a draw point in the range of 150° C. to 165° C. are particularly useful in that they can be molded at temperatures of 150° C. or slightly above. They may therefore be used with cellulose fillers such as wood flour, cotton fibers and cellulose floc which are adversely affected by higher molding temperatures. Fillers of this type are advantageous for use in forming many molded products being inexpensive and of relatively low density.

A more comprehensive understanding of this invention may be obtained by reference to the following examples.

*Example 1*

This example illustrates the production of the thermosetting hydrocarbonaceous resinous materials of this invention by the utilization of various oxidizing agents.

The starting pitch used in this example was a "medium" pitch obtained from a tar distiller. It melted at about 100° C. and was soluble in benzene to the extent of 75.1%.

This coal tar pitch as well as all of the other pitches employed in all of the examples disclosed herein complied with all of the requirements for the hydrocarbonaceous pitch heretofore described. More particularly, each of the pitches employed in the examples had a specific gravity of 1.02 or greater and when heated for 72 hours at 450° C. in a closed vessel where distillation is not possible, would yield at least 60% of solid material based on the weight of the pitch so heated and that solid material, on further heating to 950° C. at atmospheric pressure but in the absence of oxygen, would yield a carbon residue amounting to at least 80% of the solid products from the pitch.

Samples of this pitch were mixed with oxidizing agents in the proportions shown in the tabulation below. The mixtures were heated, while protected from air, under conditions of time and temperature also shown in the tabulation. The products were weighed to determine yield, and then characterized by solubility in benzene. Other oxidizing agents such as picric acid could be employed rather than those described in this example. For comparison, the same pitch without any oxidizing agent was treated for a longer period, but otherwise in the same manner, as some of the mixtures of pitch and oxidizing agent.

| Reagent used | Amount of reagent (percent of pitch) | Conditions of heating | | Characteristics of product | |
|---|---|---|---|---|---|
| | | Time (hours) | Temperature (° C.) | Solubility in benzene (percent) | Yield (percent of pitch) |
| m-Dinitrobenzene | 11.1 | 96 | 225 | 35.5 | 102.3 |
| Sulfuric acid | 11.3 | 72 | 225 | 39.5 | 99.4 |
| Benzene disulfonic acid | 15.8 | 48 | 225 | 34.0 | 105.6 |
| Do | 15.8 | 48 | 250 | 32.0 | 103.2 |
| Nitric acid | 6.2 | 120 | 205 | 35.0 | |
| Ammonium nitrate | 9.3 | 120 | 205 | 46.5 | 99.8 |
| None | None | 168 | 205 | 74.0 | 99.9 |

The benzene solubility of the samples was measured by refluxing, for one hour with 100 cc. of benzene, one gram of the resin, which had been ground to pass a 65 mesh screen. After refluxing, the undissolved residue was brought upon a weighed filter, washed with additional benzene, dried at 100° to 110° C. and weighed.

The preparations of Example 1 show that a wide variety of oxidizing agents, including oxidizing acids, oxidizing salts, and organic compounds such as nitro compounds and sulfonates are effective in varying degree for producing the polymerization of pitch, as indicated by decreased solubility and volatility. The salts are less effective than the corresponding acids, perhaps due to the fact that they are not soluble in the pitch. The most useful reagents for carrying out the invention are oxidizing acids such as sulfuric and nitric and organic compounds such as sulfonates and nitro compounds.

In any resin system, wherein a thermosetting or thermoset resin can be formed from two or more starting materials, the starting materials are used in proper amounts to achieve the desired results. For example, in the well-known phenol-aldehyde system sufficient aldehyde, in proportion to the phenol, is used, regardless of the identity of the aldehyde as formaldehyde, acetaldehyde, or other. If too little aldehyde is used, thermosetting resins are not obtained as shown, for example, by the "two-step" phenolic-aldehyde resins from which thermosetting or thermoset products cannot be obtained unless additional aldehyde is added to the intermediate resin. If excess aldehyde is used, the properties of the final product may be altered, or perhaps the excess may be wasted because the combining capacity of the phenol is not sufficient to react with all the aldehyde present.

In the phenol-aldehyde system it is relatively easy to choose and define the proper amount of aldehyde because the reaction whereby thermosetting and thermoset resins are formed is a reaction of the two recognized functional groups, the aldehyde and the hydroxyl of the phenol. On the other hand, with a mixture as complex as pitch, and with oxidizing agents which can be reduced in several different ways or to several different levels, it is not possible to identify chemically equivalent amounts of reactants with the precision possible in the phenol-aldehyde system, nor is it possible to define oxidizing equivalence as in ordinary analytical chemistry. Nevertheless, it has been found by experiment that there is a minimum amount of oxidizing agent required with pitches herein defined to produce the thermoset and thermosetting resins of this invention.

Somewhat less than that minimum may be used if completely thermoset characterstics are not ultimately required, as for resins to be used at relatively low temperatures. However, if a thermosetting resin is to be employed for the ultimate production of a thermoset resin, at least the minimum is used. Generally it is preferred to use somewhat more than the minimum to insure completely thermosetting properties and to provide for small processing variables. Very considerable excess may be used to provide more rapid reaction or to obtain the modification of properties as herein described in connection with Example 7. For example, if m-dinitrobenzene is used as oxidizing agent in amount equal to 14% of the pitch by weight, a product that is barely thermoset is obtained when the reaction is ultimately carried to completion. If only 11% is used, the final resin produced will not be ultimately completely thermoset, even when the resin-forming reaction has been carried to completion. However, the final product will soften only at very high temperatures and is useful where completely thermoset properties are not necessary.

For certain purposes less than 11% of the m-dinitrobenzene may give valuable resinous products. For example, if 7.5% is used, the normal polymerizing reaction proceeds until the oxidizing agent is exhausted. At this point, the resin is only partially thermoset, being a thermoplastic like the "two-step" phenol-aldehyde resins. Unlike the phenolics, however, this resin is useful because of its high chemical resistance and relatively high softening point, in the neighborhood of 250° C. Resins of such hardness when suitably compounded with filler and molded, give formed articles which are fairly stable dimensionally at temperatures as high as 200° C., where some thermoset resins, such as phenolic, show evidence of instability.

It has been found that thermoplastics produced with proportions of m-dinitrobenzene below 7.5% of the pitch weight have softening characteristics which permit molding by conventional procedures, as with steam heated platens, or with cellulosic material as filler. For example, when 96.5 parts of a coal-tar pitch with a melting point of 105° C. was reacted to completion with 3.5 parts of m-dinitrobenzene the thermoplastic resin produced had a draw point of 160° C. When this resin was compounded with an equal weight of wood flour, the molding composition thus produced could be formed into dense molded pieces by compressing at only 190° C.

However, at least 14% of m-dinitrobenzene is required to produce the completely thermosetting resins of this invention. 17.6% has been established by experiment as generally a preferred proportion for the previously described advantages. Twenty percent has frequently been used to obtain rapid cure, and proportions up to 25% to obtain very low solubility in the final thermoset resin. Even so much as 33% has been used in some instances, although a proportion of m-dinitrobenzene equal to 25% of the pitch or higher may be wasteful or objectionable. Thus, the proportions of m-dinitrobenzene from about 3% to 25% of the pitch have given useful products, although 14% to 20% has been the preferred range for thermoset products, and 3% to 8% for thermoplastics.

The proper amount of oxidizing agent, even though it must be established empirically, depends on properly balancing the reducing capacity of the pitch and the oxidizing capacity of the oxidizing agent, even though these capacities cannot be expressed precisely in terms of oxidation-reduction equivalents. This is shown in the results of an experiment wherein completely thermoset resins were prepared from a coal tar pitch using two different oxidizing compounds, the oxidizing capacities of which resulted from the presence of the same oxidizing function, namely, the nitro group.

In the experiment, the amount of each oxidizing agent was chosen to provide the same amount of oxidizing capacity in accordance with the hypothesis that, given the same oxidizing group reacting with the same reducing agent, the pitch, the course of the oxidation-reduction reaction should be the same, and a similar degree of polymerization should be effected by reaction of a like weight of nitro group regardless of the compound in which it occurred. After calculating the amounts of the two, about 20% excess of m-dinitrobenzene over the equivalent amount of picric acid was used to allow for the greater volatility of the m-dinitrobenzene and for the probable effect of that part of the oxidant molecule retained in the resin. Such retention, amounting to about 10% of the product weight as shown in the results of the experiment reasonably should be greater for the trifunctional picric acid than for the difunctional m-dinitrobenzene, and should affect the solubility of the product to some extent. The close correspondence of polymerization level of the two products of the experiment, as shown by solubility in benzene, demonstrates that the extent of polymerization is primarily a result of the amount of oxidizing capacity used up in the polymerization reaction.

The results of the experiment are as follows:

| | m-Dinitrobenzene | Picric acid |
|---|---|---|
| Amount used per 100 grams of pitch: | | |
| Grams | 25.0 | 17.8 |
| Moles | 0.15 | 0.078 |
| Grams of nitro group | 13.7 | 10.8 |
| Gram molecular weights of nitro group | 0.30 | 0.24 |
| Conditions of heating: | | |
| Time (hours) | 168 | 72 |
| Temperature (° C.) | 205 | 225 |
| Solubility of resin produced in benzene (percent) | 10.0 | 9.5 |
| Yield of resin (percent of pitch) | 108.5 | 110.5 |

The following considerations further strengthen the hypothesis that oxidation is the prime function of the reagents which were found useful for converting pitches to the thermoset and the thermosetting resins of this invention. If the polymerization actually is promoted or effected by oxidation, then the effect of equivalent amounts (with respect to oxidizing capacity) of two difunctional oxidizing agents should correspond even more closely than in the case of a di- and a tri-functional reagent as used in the above described experiment. Equations 1 and 2 below are believed to represent plausible reactions for two difunctional reagents which have been found useful for the practice of this invention:

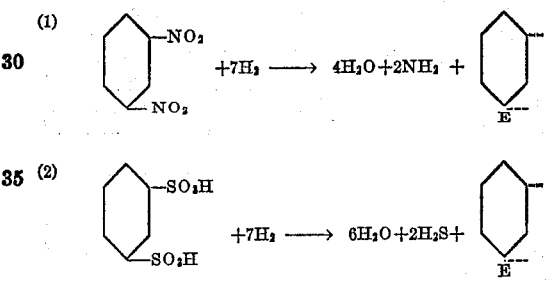

These equations represent that one mole of m-dinitrobenzene or one mole of benzene disulfonic acid removes seven moles of hydrogen from the pitch. This hydrogen is eliminated as water, ammonia or hydrogen sulfide, while the carbon ring of either reagent, after removal of oxidizing functional groups is designated as the free radical E which may be capable of combining in the polymer molecule. The gaseous end products, e.g. hydrogen sulfide and ammonia, are partially removed during the production of the partially cured resinous materials of this invention and the precure of the molding compositions containing such resinous materials. The remainder of such gaseous end products are released in the final cure in accordance with the processes described in this application.

Assuming those equations correctly represent the reaction of the two oxidizing agents (and that similar equations could be written for other oxidizing agents), a gram equivalent weight of oxidizing agent for purposes of forming the novel resins of this invention can be defined as the number of grams of reagent required to oxidize one gram molecular weight of hydrogen. Thus, one gram molecular weight of m-dinitrobenzene or of benzene disulfonic acid reacts with seven gram molecular weights of hydrogen. An equivalent weight of dinitrobenzene would be 24 grams, and of benzene disulfonic acid 34 grams. The reaction of an equivalent amount of each of the two oxidizing agents with a like amount of pitch should yield resinous products of approximately the same degree of polymerization. The correctness of this conclusion was proven by the preparations of Example 2 wherein m-dinitrobenzene and benzene disulfonic acid were reacted in the proportion of approximately 0.4 gram equivalent weight of oxidizing agent per 100 g. of pitch.

Example 2

To 18 g. of the pitch used in Example 1, 2.00 g. of m-dinitrobenzene was added. To a duplicate sample of pitch 2.84 g. of benzene disulfonic acid was added, and two preparations were heated for 24 hours at 225° C. Similar pairs of reactions were carried out with 48, 72, and 96 hours of heating, respectively. The solubility of each resin preparation was determined as a measure of the degree of polymerization.

| Resins prepared from 18 g. pitch and 2.00 g. m-dinitrobenzene | | Resins prepared from 18 g. pitch and 2.84 g. benzene disulfonic acid | |
|---|---|---|---|
| Time of heating at 225° C. (Hours) | Solubility in benzene (percent) | Time of heating at 225° C. (Hours) | Solubility in benzene (percent) |
| 24 | 35.0 | 24 | 33.5 |
| 48 | 35.0 | 48 | 35.5 |
| 72 | 34.0 | 72 | 34.0 |
| 96 | 33.5 | 96 | 33.5 |

The close correspondence of solubilities shows that approximately the same degree of polymerization was effected by 2.84 g. of benzene disulfonic acid as by 2.00 g. of m-dinitrobenzene under like conditions of reaction. Since these amounts were chosen on the basis of predicted oxidation reactions, the preparations of Example 2 confirm the hypothesis that the prime function of the reagents effective for the formation of the novel resins is facilitation of hydrogen removal by oxidation.

In Example 2 solubility is used as a criterion of degree of polymerization. Other criteria could be used. Thus, it is characteristic of all polymerization systems that, as degree of polymerization becomes progressively higher, not only does solubility decrease, but also volatility falls and fusion of the polymerized product becomes progressively more difficult, requiring progressively higher temperatures or, in some polymerization systems such as that by which the novel resins are formed, becoming impossible at any temperature.

Example 3

Samples of resin were prepared as in Example 1, using the same pitch and the same method of heating. In this example, four parts of the "medium" pitch was used to one part of m-dinitrobenzene. The samples were heated at 185° for different time intervals as shown below, and the yield and solubility in benzene were determined for each product. Results compare as follows:

| Time of heating (hours) | Characteristics of product | |
|---|---|---|
| | Yield of resin (percent of pitch used) | Solubility in benzene (percent) |
| 12 | 119.1 | 51.0 |
| 24 | 117.4 | 46.0 |
| 72 | 115.4 | 38.0 |
| 120 | 112.5 | 30.0 |
| 168 | 112.8 | 26.0 |
| 240 | 113.6 | 24.5 |
| 336 | 113.2 | 12.5 |

The data of Example 3 show that solubility decreased with increasing time of heating.

Fusibility, or melting point, is not a property which can be measured like solubility. Even the pitches of commerce, before reaction in accordance with this invention to form polymerization products, do not have true melting points. Rather they soften and liquefy over a range of temperature, and the so-called melting points of pitches are determined by empirical methods well known in the art. After a moderate degree of polymerization, even these empirical methods of inapplicable, although the ability to fuse may persist after a rather extensive polymerization. A test was therefore devised to detect the ability of the highly polymerized resins to fuse even though a melting point cannot be determined. This test consists of grinding a sample to a fine powder, e.g., to pass a 65 mesh screen. When the fine powder is rapidly heated to 950° C., it will fuse into a continuous mass or at least adhere together before conversion to carbon if it is capable of fusion.

This test applied to the resin preparations of Example 3 showed the first four to be fusible; i.e., fusibility disappeared after about 120 hours of heating. The last three showed no signs of fusibility. Thus, in the practice of this invention, the polymerization is characterized by decreased fusibility and solubility. However, fusibility and solubility are not precisely correlated since as polymerization increases, some solubility may still be measured even after all signs of fusibility have disappeared. These fusibility tests confirm that a benzene solubility of below about 25% indicates the thermoset stage of a resin.

In Examples 1, 2 and 3, the preparation of the resins has been illustrated by use of a single pitch. However, the preparation of the resins is not limited to the use of a single starting material, pitches of the class defined herein being generally useful as starting materials. Examples of the use of other pitches are shown in Example 4.

Example 4

Intimate mixtures of m-dinitrobenzene with each of several pitches were heated, in substantially the same manner as in preceding examples, to effect polymerization. Identity of the pitches and the exact conditions of reaction are given in the following tabulation.

| Resin sample | Starting material | Amount of m-dinitrobenzene (percent of pitch) | Conditions of preparation | | Yield (percent of pitch) | Solubility in benzene (percent) |
|---|---|---|---|---|---|---|
| | | | Reaction time (Hours) | Reaction temperature (° C.) | | |
| A | A soft coal tar pitch. | 11.1 | 72 | 205 | 101.0 | 44.5 |
| B | A medium pitch (different material from that used in other examples). | 11.1 | 72 | 225 | 103.0 | 35.0 |
| C | A hard coal tar pitch. | 11.1 | 72 | 205 | 104.0 | 35.4 |
| D | ----do---- | 11.1 | 72 | 225 | 105.5 | 29.5 |

Thus far it has been disclosed that the practice of this invention requires, first, selection of a suitable hydrocarbonaceous pitch starting material; and, second, reaction therewith of any of a wide variety of oxidizing reagents. The degree of polymerization is dependent on the amount of reagent used, the reaction time and temperature. The effects of time, temperature, and amount of reagent, using one pitch and one reagent for the purpose will now be demonstrated more precisely.

To this end, the preparations of Example 5 have been arranged to show the effect of time at reaction temperature. In these preparations, a "medium" pitch melting at about 100° C. was used with the indicated amounts of reagent (m-dinitrobenzene), and the time at reaction temperature was varied. At each level of reagent the time was increased until no further polymerization, as measured by solubility, could be observed, or until reaction was proceeding only at a very slow rate.

Example 5

RESINS PREPARED WITH "MEDIUM" PITCH AND m-DINITROBENZENE AS OXIDIZING REAGENT

| Amount of reagent (percent of pitch) | Reaction temperature (° C.) | Reaction time (hours) | Resin characteristics | |
|---|---|---|---|---|
| | | | Yield (percent of pitch) | Solubility in benzene (percent) |
| 5.3 | 185 | 24 | 102.9 | 53.0 |
| | | 48 | 102.5 | 49.2 |
| | | 72 | 102.6 | 49.5 |
| | | 96 | 102.4 | 48.0 |
| | | 120 | 102.4 | 47.4 |
| | | 168 | 102.0 | 48.7 |
| 11.1 | 165 | 24 | 107.3 | 57.0 |
| | | 48 | 105.6 | 51.3 |
| | | 72 | 105.2 | 48.0 |
| | | 96 | 104.9 | 48.3 |
| | | 120 | 105.5 | 48.0 |
| | | 168 | 104.6 | 45.0 |
| | | 336 | 102.4 | 37.0 |
| 11.1 | 185 | 12 | 107.7 | 49.0 |
| | | 24 | 107.6 | 46.5 |
| | | 72 | 106.1 | 40.5 |
| | | 120 | 105.1 | 32.5 |
| | | 168 | 104.1 | 31.0 |
| | | 240 | 104.5 | 30.5 |
| | | 336 | 104.5 | 29.4 |
| 11.1 | 205 | 12 | 104.0 | 41.0 |
| | | 24 | 103.1 | 39.5 |
| | | 48 | 105.2 | 36.5 |
| | | 72 | 103.1 | 35.0 |
| | | 96 | 102.4 | 35.5 |
| | | 120 | 102.3 | 36.5 |
| | | 168 | 103.1 | 33.5 |
| 11.1 | 225 | 8 | 103.3 | 40.0 |
| | | 16 | 102.3 | 36.0 |
| | | 24 | 102.1 | 35.0 |
| | | 32 | 102.2 | 35.0 |
| | | 48 | 101.1 | 34.0 |
| | | 72 | 102.0 | 33.5 |
| | | 96 | 102.2 | 35.5 |
| | | 120 | 101.2 | 30.0 |
| 11.1 | 250 | 4 | 95.4 | 35.0 |
| | | 8 | 99.7 | 34.7 |
| | | 12 | | 31.0 |
| | | 16 | 98.3 | 27.0 |
| | | 24 | 97.3 | 26.5 |
| | | 48 | 92.7 | 19.5 |
| | | 72 | 96.0 | 16.0 |
| | | 96 | 92.5 | 21.0 |
| 25.0 | 185 | 12 | 118.7 | 51.0 |
| | | 24 | 117.4 | 46.0 |
| | | 72 | 115.5 | 38.0 |
| | | 120 | 112.6 | 30.0 |
| | | 168 | 112.9 | 26.0 |
| | | 240 | 113.7 | 24.5 |
| | | 336 | 112.9 | 22.5 |
| 25.0 | 225 | 16 | 114.2 | 25.0 |
| | | 24 | 116.3 | 28.5 |
| | | 32 | 115.6 | 11.5 |
| | | 48 | 115.3 | 11.4 |
| | | 120 | 113.3 | 4.5 |

Taking solubility as the measure of completeness of the polymerization reaction (i.e. when the solubility in benzene becomes substantially constant with further heating), the tabulation of Example 5 shows:

(a) With any given amount of reagent and reaction temperature, a certain time interval is required before the reaction is complete.

(b) At a given reaction temperature, the time required becomes greater as the amount of reagent is increased. Thus at 185° C., about 72 hours are required with 5.3 percent of reagent, 168 hours with 11.1 percent, and 336 hours with 25 percent. At 225°, 48 hours are required with 11.1 percent of reagent, 72 hours or more with 25 percent.

(c) With a given amount of reagent the time required becomes less as the reaction temperature is raised. Thus with 11.1 percent of reagent, 504 hours or more are required at 165° C., 168 hours at 185°, 72 hours at 205°, 48 hours at 225°. At 250°, also, it appears that 48 hours are required. However, it is to be noted, first, that the final solubility is of a lower order than for resins made at lower temperatures and, second, that the yields are consistently below 100 percent of the starting material. It is believed that the incidence of some additional reaction, beyond that occurring at lower temperatures between pitch and reagent, thus is indicated.

To demonstrate the effect of temperature in carrying out the invention, this condition has been made the variable in the preparations tabulated as Example 6. Herein the reaction times vary, but always are sufficiently long so that further polymerization at the indicated temperature proceeds only at a very slow rate.

Example 6

RESINS PREPARED WITH "MEDIUM" PITCH AND m-DINITROBENZENE AS OXIDIZING REAGENT

| Amount of reagent (percent of pitch) | Reaction time (hours) | Reaction temperature (° C.) | Resin characteristics | |
|---|---|---|---|---|
| | | | Yield percent of pitch | Solubility in benzene (percent) |
| 5.3 | 504 | 165 | 101.6 | 56.5 |
| | 168 | 205 | 99.3 | 42.0 |
| | 120 | 225 | 96.3 | 36.5 |
| | 96 | 250 | 90.9 | 38.5 |
| | 18 | 275 | 87.6 | 35.5 |
| | 18 | 300 | | 37.8 |
| | 18 | 325 | 72.0 | 29 |
| 8.1 | 504 | 165 | 103.9 | 37.3 |
| | 168 | 205 | 101.8 | 37.5 |
| | 120 | 225 | 99.6 | 35.0 |
| | 96 | 250 | 92.9 | 32.0 |
| 11.1 | 504 | 165 | 103.1 | 34.5 |
| | 336 | 185 | 104.6 | 29.4 |
| | 168 | 205 | 102.9 | 33.5 |
| | 120 | 225 | 101.2 | 3.02 |
| | 96 | 250 | 92.4 | 21.0 |
| | 42 | 275 | 89.1 | 15.5 |
| | 36 | 300 | 86.7 | 13.0 |
| | 30 | 325 | 85.1 | 16.0 |
| | 24 | 350 | 80.8 | 10.5 |
| | 18 | 375 | | 4.7 |
| | 12 | 400 | 68.7 | 3.5 |
| 14.3 | 504 | 165 | 104.5 | 32.0 |
| | 168 | 205 | 104.2 | 28.0 |
| | 120 | 225 | 102.9 | 17.5 |
| | 96 | 250 | 93.8 | 7.0 |
| 17.7 | 504 | 165 | 106.4 | 33.5 |
| | 168 | 205 | 105.2 | 15.5 |
| | 120 | 225 | 103.2 | 12.0 |
| | 96 | 250 | 95.7 | 4.0 |

Again, as in previous discussion of Example 5, taking solubility as the measure of degree of polymerization, the tabulation of Example 6 shows:

(a) With any given proportion of reactant the tendency with increasing reaction temperature is toward a greater degree of polymerization.

(b) However, at reaction temperatures of 225° or lower the degree of polymerization obtained when the reaction is completed is approximately the same, regardless of temperature, if the proportion of reagent is not greater than 11.1 percent, as indicated by essentially constant solubility. It is to be understood, of course, that in interpreting the solubilities of the large number of preparations in Example 6, some allowance must be made for errors, such as chance experimental error, accidental admission of air during reaction, etc. Experience has shown that a variation of ± two to three percent in solubility is to be expected.

(c) At reaction temperatures of 250° or higher definite and characteristic differences in the products are observed. Yield drops suddenly, and there is a marked decrease in solubility and volatility. It is believed that these sudden changes indicate the incidence of a further step occurring in the polymerization reaction by which the novel resins are formed at temperatures of 225° or lower. It is recognized that evaporation either of starting material or reagent could also explain the decrease in yield. Probably both causes are effective, and the invention is not limited by this interpretation.

(d) Yields are markedly greater at temperatures below 250° C. than at this temperature or above. This drop in yield is observed regardless of the amount of reagent used, although it is less with higher proportions of reagent. By contrast, the degree of polymerization increases markedly, even at temperatures below 250° if sufficient reagent is used.

The observed effects of increasing temperature in the practice of this invention may be explained as follows: Regardless of the reaction mechanism, the reaction by which the novel resins are formed from pitch and suitable reagents proceeds at an appreciable rate at 165° C., and at an increasing rate as the temperature is raised. In addition to the effect of temperature on rate of reaction, higher temperatures cause a greater extent of reaction; i.e., greater effectiveness of the reagents. This second effect of temperature is very noticeable at 250° C. or higher, but may be appreciable at lower temperatures if sufficient reagent is present.

Resins of this invention may thus be formed from the defined pitches and reagents in the range of between 165° and 400° C. The higher yields are obtained at temperatures below 250° C., although both yield and degree of polymerization depend on the amount of reagent used. In forming the novel resins the amount of reagent should be chosen on the basis of what is required with respect to yield and degree of polymerization.

To demonstrate further the effect of the amount of reagent used, there is arranged the tabulation of Example 7. Herein, as in Examples 5 and 6, the time of reaction always is sufficient to effect essentially complete reaction. The preparations are arranged to illustrate the effect, at several temperatures, from 165° to 400° C., of increasing the proportion of reagent up to 25 percent of the weight of the pitch used. Examples 5, 6 and 7 include thermosetting and thermoset resins of this invention.

*Example 7*

RESINS PREPARED WITH "MEDIUM" PITCH AND m-DINITROBENZENE AS OXIDIZING REAGENT

| Reaction temperature (° C.) | Reaction time (hours) | Amount of reagent (percent of pitch) | Resin characteristics | |
|---|---|---|---|---|
| | | | Yield (percent of pitch) | Solubility in benzene (percent) |
| 165 | 50 | 5.3 | 101.3 | 56.5 |
| | | 8.1 | 102.1 | 37.3 |
| | | 11.1 | 102.7 | 34.5 |
| | | 14.3 | 104.3 | 32.0 |
| | | 17.7 | 106.4 | 33.5 |
| | | 25.0 | 117.3 | 31.0 |
| 185 | 336 | 11.1 | 104.6 | 29.4 |
| | | 25.0 | 120.5 | 12.5 |
| 205 | 168 | 5.3 | 99.7 | 42.0 |
| | | 8.1 | 101.9 | 37.5 |
| | | 11.1 | 103.0 | 33.5 |
| | | 14.3 | 104.8 | 28.0 |
| | | 17.7 | 105.2 | 15.5 |
| | | 25.0 | 115.3 | 10.0 |
| 225 | 120 | 5.3 | 96.1 | 36.5 |
| | | 8.1 | 97.0 | 25.0 |
| | | 11.1 | 101.1 | 30.2 |
| | | 14.3 | 102.9 | 17.5 |
| | | 17.7 | 100.1 | 12.0 |
| | | 25.0 | 114.5 | 4.5 |
| 250 | 96 | 5.3 | 89.7 | 38.5 |
| | | 8.1 | 92.9 | 32.0 |
| | | 11.1 | 92.4 | 11.0 |
| | | 14.3 | 93.6 | 7.0 |
| | | 17.7 | 95.8 | 4.0 |
| | | 25.0 | | 2.0 |
| 275 | 18 | 5.3 | 87.6 | 35.5 |
| | 42 | 11.1 | 89.1 | 15.5 |
| | 42 | 25.0 | | 3.0 |
| 300 | 18 | 5.3 | | 37.8 |
| | 36 | 11.1 | 86.7 | 13.0 |
| | 36 | 25.0 | 105.4 | 3.0 |
| 325 | 18 | 5.3 | 72.0 | 29.5 |
| | 30 | 11.1 | 85.1 | 16.0 |
| | 30 | 25.0 | 104.5 | 2.5 |
| 350 | 24 | 11.1 | 80.8 | 10.5 |
| | | 25.0 | 101.1 | 1.5 |
| 375 | 18 | 11.1 | | 4.7 |
| | | 25.0 | 105.3 | 1.0 |
| 400 | 12 | 11.1 | 68.7 | 3.5 |
| | | 25.0 | 102.2 | 1.0 |

The tabulation of Example 7 demonstrates again the various effects of time and temperature which have been shown by Examples 5 and 6, and more specifically illustrates the effect of proportion of reagent under any given conditions of reaction time and temperature. Thus:

(*a*) Increasing the amount of reagent always results in increased yield and higher degree of polymerization as measured by solubility.

(*b*) The effectiveness of any given amount of reagent appears to increase as the temperature is raised. For example, at 165°, use of the smallest proportion indicated, 5.3 percent of the pitch, resulted in only limited polymerization. At higher temperatures the effect of this small amount of reagent is greater. Similarly, use of a relatively large amount of reagent, e.g., 25 percent, had only a moderate advantage over 17.7 percent at 165°, but at higher temperatures, even only 185°, its effect becomes increasingly pronounced. Intermediate proportions of reagent, such as 144.3 or 17.7 percent, were of little advantage over 8.1 or 11.1 percent, at lowest temperatures, but at higher temperatures of 205° and 225°, the advantage of increased amount of reagent becomes more pronounced.

(*c*) There appears to be some proportion of reagent between 17.7 and 25.0 percent of the pitch at which the effect on yield of product becomes exaggerated. Thus, in the tabulation of Example 7, the yields obtained with 8.1, 17.7 and 25.0 percent can be compared. The difference in yield may be as little as 3 percent between the first two levels of reagent. In contrast, the difference in yield with 25 percent as compared with 17.7 percent is 10 to 15 percent of the pitch weight. Evidently, as the concentration of the reagent is increased, the tendency on the part of the reagent molecules to be combined in the polymer molecule becomes suddenly more pronounced above a certain level of reagent.

The resinous products of this invention are prepared by reacting pitch with exodizing reagents at elevated temperatures for a time sufficient to effect reaction. The pitch may be any of those falling within the class defined herein, but because of commercial availability it is preferably a coal tar pitch. Although any oxidizing agent may be used which can be mixed with the pitch there are, as has been heretofore explained, certain practical limitations which enter into the choice of an oxidizing agent. Preferably, the oxidizing agent should be one which may be intimately mixed with the pitch. In general, organic oxidizing agents and particularly those containing nitro groups, such as aromatic polynitro compounds, are found desirable. Polynitrobenzene and particularly m-dinitrobenzene are preferable because of practical as well as theoretical considerations.

The reaction or reactions by which the thermosetting resins are formed proceed at increasing rate as the temperature is increased up to about 350° to 400° C. At any selected temperature, the time required for reaction can be determined experimentally, and is dependent upon the amount of reagent used. Choice of the amount of reagent must be based on the proporties required for the resinous product (yield, solubility, fusibility), as illustrated by Examples 5, 6, and 7.

Thermoset resins are produced from the thermosetting resins of this invention. For instance, with reference to Example 3, resins such as the first four which are soluble to the extent of 30 to 50 percent, and which are fusible in some degree, can be converted to the infusible and relatively insoluble condition by further heating, either at the same temperature as that at which the relatively soluble and fusible products were prepared, or at a higher temperature. Conveniently in practical applications of the practice of this invention, the cure will be completed by heating for periods of a few minutes to perhaps an hour at temperatures of 250° to 350° C., preferably 275° to 325°, and most desirably at about 300° C.

*Example 8*

A practical method of producing thermoset compositions from the thermosetting resins of this invention is to completely cure a partially cured resinous composition with or without other ingredients such as fillers. This complete curing is effected at temperatures between 250° and 350° C., preferably between 275° and 325°, and most desirably at about 300° C. If the partially cured resinous composition is in the form of a molding compound, the application of super-atmospheric pressures of the order of 1000 to 4000 pounds per square inch is desirable.

The partially cured resinous material of this invention employed for this purpose is solid at 25° C., has a draw point of 150° to 275°, preferably 200° to 250° C., and benzene-soluble components of 25 to 60%, preferably 35 to 45%.

The draw point of the partially cured resinous material is determined by heating a block of metal, fitted with a device for measuring its temperature sufficiently to allow the application of a thin layer or smear of the resin to be tested. The metal block is then allowed to cool while a sharp metal point is drawn across the surface of the smear. The minimum temperature at which a mark or draw line can be observed to be made by the metal point is the draw point of the resin. It has been found that the draw point is related to more conventional properties such as softening or melting point, flow rate, etc. Determination of draw point has the advantage as a criterion of degree of cure over other tests in that it can be carried out in a few minutes while a polymerization reaction is being carried out.

The partially cured thermosetting resins utilized in this example to produce thermoset resins are prepared by reacting a medium coal tar pitch which conformed to the requirements of the pitch heretofore defined and m-dinitrobenzene in the proportion by weight of 85 parts of pitch to 15 parts of the m-dinitrobenzene. The characteristics of the resins obtained when the reaction mixture is heated at 275 C. for varying periods of time is indicated in the following table:

PREPARATION OF RESINS AT 275° C.

| Preparation No. | Total time in oven (minutes) | Yield (percent of combined pitch and m-dinitrobenzene | Draw point (° C.) | Solubility in benzene (percent) |
|---|---|---|---|---|
| 1 | 10 | 94.0 | 180 | 47 |
| 2 | 15 | 94.0 | 267 | 35 |
| 3 | 20 | 91.5 | 265 |  |
| 4 | 25 | 92.0 |  | 33 |
| 5 | 30 | 90.0 |  | 29 |
| 6 | 45 | 90.0 |  | 31 |
| 7 | 60 | 90.0 |  | 32 |

Preparations designated as 1, 2 and 3 conformed to the requirements of the partially cured thermosetting resins, and such partially cured thermosetting resins could be readily converted to the thermoset compositions by heating within the range of 250° to 350° C. For example, as shown in the above table, the heating of such resins at 275° for a sufficient period of time would produce infusible thermoset resins, as for example, those designated as preparation No. 4, 5, 6, and 7 in the above table.

The fully cured or thermoset state is indicated by the lack of manifestation of fluidity of the resin at 375° C.

A convenient test to determine whether a resin manifests fluidity is to place a few particles or granules of crushed resin on a metal block pre-heated to 375° C. If in the course of a few seconds the irregular particles coalesce or contract in the manner of a liquid into minimum volume and approach spherical shape, the resin has not been thermoset. If, on the other hand, the irregular shape of the particles is retained, the material is thermoset, fully cured, and infusible even though further hardening may occur.

In many, but not all, cases the thermoset state can also be ascertained by the benzene-soluble components of the resin. If the benzene-soluble components are less than 20%, the thermoset state has been reached. However, if the benzene-soluble components exceed 20%, the resin might still be thermoset. This is illustrated by the thermoset compositions designated as preparation 4, 5, 6, and 7 in the above table in which the benzene-soluble component is significantly greater than 20%. It has been found that the benzene-soluble component falls to the 20% level when such thermoset resins are heated over longer periods of reaction time.

*Example 9*

A resin was prepared by heating a mixture of 85 parts of coal tar pitch and 15 parts of m-dinitrobenzene at 195° to 210° C. until the draw point was 205°. The product, a shiny brittle solid, was finely ground in a hammer mill. A mixture of 100 parts of the powdered resin and 100 parts of asbestos floats was prepared by tumbling the ingredients in a rolling jar for about 20 minutes. Forty grams of the asbestos-resin mixture, compressed at room temperature at 3000 p.s.i. to form a disc approximately the size and shape desired as a final product, was placed in an oven at 300° C. for 30 minutes. At the beginning of this treatment, as the temperature of the disc (preform) approached 300°, its color changed rapidly from gray to black as the flow of the resin covered the asbestos surface, and it became very soft and compressible. At the end of the oven treatment, it had reached the state which is desirable for final molding, i.e., the asbestos surface covered with a film of resin as shown by the black color, but the texture of the preform such that, at oven temperature, it was no longer very soft but barely compressible under pressure due to the advancement of the cure of the resin. This precured thermosetting composition at 300° C. would manifest plasticity when subjected to 500 pounds per square inch pressure and no significant plasticity when subjected to 5 pounds per square inch pressure. The precured preform then was placed in a cylindrical mold at 250° C., allowed to absorb heat for three minutes before the application of pressure, then subjected to 3000 p.s.i. for one hour while the temperature was maintained at 250° C. The mold was opened without cooling. The product, which was thermoset, was a shiny, hard disc, even at mold temperature, which conformed to the dimensions of the mold and did not materially change when cooled to room temperature or when heated to 300° C. It would manifest no significant plasticity at 300° C. when subjected to 500 pounds per square inch pressure.

*Example 10*

From the same resin used in Example 9 a mixture with asbestos floats was prepared in the manner described except that 90 parts of resin was used with 100 parts of floats. A preform, made as described in Example 9, was placed in an oven at 300° C. for 25 minutes. The preform, placed in a mold at 300° C., first was allowed to heat for 12 minutes before the application of pressure, then was pressed at 3000 p.s.i. for 20 minutes. After cooling to approximately room temperature, the pressure was released, and the molded disc obtained was similar to that obtained in Example 9. It was hard, black and shiny, and permanently rigid even when heated to 300° C.

The thermosetting resins of this invention can be applied to many of the uses of conventional thermosetting and thermoset resins. Thus, when the polymerization has been carried only to a relatively low degree of completion, the resins can be used as an impregnator to fill the voids of porous media in order to reduce permeability or increase strength; the polymerization is then carried out or completed in the pores, leaving them filled with the thermoset resin of this application. Or, as described in Examples 9 and 10, the resins can be mixed with fibrous or granular fillers such as asbestos, slatedust, etc., and the "molding powders" thus prepared can be formed into useful shapes by molding and extruding. The resin in the formed shape then can be converted to the substantially infusible and relatively insoluble state by further heating carried out either as a part of the forming operation or as a separate step following the forming operation. The resin, either as a molten fluid or as a varnish can be used as a laminating resin with, for example, asbestos or glass fiber felt. The resin can be fully cured to the substantially infusible and relatively insoluble form and used as a filler or as an abrasive or frictional agent.

As hereinbefore described, the resinous material may be neither thermosetting nor thermoset, and instead may be thermoplastic, being a solid at 25° C., manifesting no draw point at 275° C., and being fusible between the temperatures of 275–400° C., such resin having 25–60% of benzene-soluble components. By reason of its high chemical resistance and hardness, the thermoplastic resin has high utility and may be extruded in combination with fillers, etc., or molded by injection molding, etc.

Example 11

A "medium" pitch obtained from a tar distiller melted at about 100° C., was soluble in benzene to the extent of 75.1%.

This coal tar pitch as well as all of the other pitches employed in the examples disclosed herein would comply with all of the requirements for the hydrocarbonaceous pitch heretofore described. More particularly, each of the pitches employed in the examples had a specific gravity of 1.02 or greater and when heated for 72 hours at 450° C. in a closed vessel where distillation is not possible would yield at least 60% of solid material based on the weight of the pitch so heated and that solid material, on further heating to 950° C. at atmosphereic pressure but in the absence of oxygen, would yield a carbon residue amounting to at least 80% of the solid products from the pitch.

A mixture of four parts of this "medium" pitch and one part of m-dinitrobenzene was heated at 205° C. for one week. The product was a shiny black solid, the weight of which was 86.8% of the combined weight of pitch and m-dinitrobenzene, or 108.5% of the pitch used. This product was soluble in benzene to the extent of only 10.0%. The material showed no signs of melting when heated. Even when ground to a fine powder and heated to 950° C., the carbon residue was a loose powder, showing that softening, which would have caused the particles to adhere, had not taken place. The weight of the carbon residue was about 72% of the thermoset resin heated.

The benzene solubility was measured by refluxing for one hour with 100 cc. of benzene a one gram sample of resin, which had been ground to pass a 65 mesh screen. After refluxing, the undissolved residue was brought upon a weighed filter, washed with additional benzene, dried at 100° C. to 110° C., and weighed.

In Example 11 a reaction occurred which converted the fusible, relatively soluble pitch to an infusible solid, for when the same pitch was heated in the absence of air under the same conditions of time and temperature except that no m-dinitrobenzene was present, the product showed practically no change from the starting material, being soluble in benzene to the extent of 74.0% and being like the original pitch readily fusible at moderate temperatures.

Regardless of the mechanism of the reaction, essentially 100% of pitch substance can be converted into a resin, as identified by low solubility and volatility and by loss of fusibility, by treatment with one or more of a class of reagents under conditions of time and temperature adequate for complete reaction.

Example 12

Partially cured resins were prepared using "medium" coal tar pitch of commerce of the class hereto defined as hydrocarbonaceous starting material, and m-dinitrobenzene as oxidizing reagent. Proportion of pitch to oxidizing reagent, also time and temperature of heating were varied as shown in the following tabulation to obtain a series of fusible and relatively soluble resinous products:

| Resin No. | Amount of m-dinitrobenzene (percent of pitch) | Conditions of preparation | | Yield (percent of pitch) | Solubility in benzene (percent) |
|---|---|---|---|---|---|
| | | Reaction time (hours) | Reaction temperature (° C.) | | |
| 1 | 17.7 | 7.5 | 225 | 110.6 | 43.0 |
| 2 | 17.7 | 2.5 | 175 | 114.9 | 62.5 |
| 3 | 17.7 | 6 | 175 | 114.6 | 55.0 |
| 4 | 17.7 | 24 | 175 | 113.6 | 43.5 |
| 5 | 25 | 30 | 150 | 129.5 | 62.4 |
| 6 | 17.7 | 9 | 150 | 114.9 | 62.5 |
| 7 | 17.7 | 73 | 150 | 114.1 | 51.0 |
| 8 | 11.1 | 2.5 | 175 | 109.6 | 62.0 |
| 9 | 11.1 | 16.5 | 175 | 109.6 | 54.3 |
| 10 | 11.1 | 26 | 175 | 107.2 | 54.0 |

A sample of each of these resins was heated for ½ hour at 300° C., the cure being thus advanced to a relatively insoluble condition approaching full cure.

| Resin No. | Prepared from partially cured resin No. | Yield (percent of partially cured resin) | Solubility in benzene (percent) | Carbon Residue at 950° C. (percent) |
|---|---|---|---|---|
| 1-A | 1 | 94.7 | 19.0 | 78.5 |
| 2-A | 2 | 86.0 | 13.5 | 79.0 |
| 3-A | 3 | 90.5 | 14.0 | 70.0 |
| 4-A | 4 | 88.5 | 15.0 | 66.0 |
| 5-A | 5 | 87.5 | 19.0 | 81.0 |
| 6-A | 6 | 93.5 | 31.8 | 74.9 |
| 7-A | 7 | 91.5 | 31.0 | 71.1 |
| 8-A | 8 | 93.0 | 34.5 | 73.6 |
| 9-A | 9 | 93.5 | 32.0 | 67.0 |
| 10-A | 10 | 92.5 | 31.5 | 70.0 |

Fully cured thermoset resins can be prepared directly, in a single step, from hydrocarbonaceous pitch and oxidizing reagent as shown by the following preparations:

| Resin No. | Amount of m-dinitrobenzene (percent of pitch) | Reaction time (hours) | Reaction temperature (° C.) | Yield (percent of pitch) | Solubility in benzene (percent) | Carbon residue at 950° C. (percent) |
|---|---|---|---|---|---|---|
| 11 | 17.7 | 168 | 205 | 105.2 | 15.5 | 70.0 |
| 12 | 14.3 | 120 | 225 | 102.9 | 17.5 | 68.3 |
| 13 | 17.7 | 96 | 250 | 95.7 | 4.0 | 73.0 |
| 14 | 25 | 36 | 300 | 105.4 | 3.0 | 76.0 |
| 15 | 25 | 24 | 350 | 101.5 | 1.5 | 79.4 |

In Example 12 the fully cured resins have been characterized by "carbon residue at 950° C." This value was determined for each fully cured resin by heating a sample of the material, contained in a covered crucible, to about 950° C. by exposing the crucible directly to the heat of a gas flame for a period for 10 minutes. The weight of the carbon residue left after this treatment, expressed as percent of the sample of resin, is the "carbon residue at 950° C." as tabulated in Example 12.

In addition to the infusibility and relatively low solubility, hereinbefore discussed, a carbon residue value of at least 65% and substantially less than 100% by weight is characteristic of the thermoset resins of this invention. It will be evident that this value is a measure of volatility, i.e. as the carbon residue is greater the volatility is lower. It will also be evident that volatility, as thus measured, can never be zero even when the various products can be considered completely cured. Thus, with further reference to the carbon residue values of Example 12, a minimum volatility of about 20% is indicated. The material volatilized must consist largely of hydrogen and other products of pyrolytic decomposition of the resin molecules at the very high temperature (950° C.) used for the carbon residue determination. No organic resin would fail to be decomposed at such temperatures; hence, no resinous product could show zero volatility by this test.

Solubility of fully cured resins ranges from very low values of two percent or less up to values approaching 35%; e.g. the fully cured resins of Example 4. It is quite reasonable that some soluble material should remain even when polymerization has been completed. Such material might consist of a small proportion of unpolymerizable material present as impurity in the pitch used as starting material or it might be a minor by-product of the polymerization reaction which is not subject to further polymerization.

The resin therefore may be considered fully cured, infusible, relatively non-volatile and relatively insoluble (and herein these terms are used to so indicate) if it shows benzene solubility of less than 35%, carbon residue of at least 65% and substantially less than 100%, and no evidence of fusibility, when these characteristics are determined by the tests herein described. The fully cured or thermoset state is most specifically indicated by the lack of manifestation of fluidity at 375° C. when determined by the test heretofore described.

The resins of this invention can be applied to many of the uses of conventional thermoset resins. Thus, when the polymerization has been carried only to a relatively low degree of completion, i.e., a fusible resin or even a mixture of the reactants, resins can be used as an impregnant to fill the voids of porous media in order to reduce permeability or increase strength; the polymerization is then carried out or completed in the pores, leaving them filled with the thermoset form of the resin. Or, the resins can be mixed with fibrous or granular fillers such as asbestos, slatedust, etc., and the "molding powers" thus prepared can be formed into useful shapes by molding and extruding. The resin in the formed shape then can be converted to the substantially infusible and relatively insoluble state by further heating carried out either as a part of the forming operation or as a separate step following the forming operation. The resin, either as a molten fluid or as a varnish can be used as a laminating resin with, for example, asbestos or glass fiber felt. The resin can be fully cured to the substantially infusible and relatively insoluble form and used as a filler or as an abrasive or frictional agent.

The resins thermoset of this invention are particularly useful because of certain properties not commonly found in resinous materials. In their substantially infusible and relatively insoluble state they are characterized, other than by solubility, volatility, and fusibility hereinbefore discussed, by being hard, shiny, black materials solid at 25° C. These resins unlike many conventional resins, are exceptionally stable to heat and to numerous corrosive agents. Thus, at 350° C., where many resinous materials are completely decomposed, the thermoset resins of this invention are completely stable; and even at higher temperatures, e.g. 400° C., where most resins carbonize and/or depolymerize, the thermoset resins of this invention show only moderate weight loss and the residue remains a shiny, black, resinous-appearing material.

Typical behavior of the resins of this invention at high temperatures in the absence of oxidizing gases is illustrated by the following data obtained by heating five resins prepared from a medium coal tar pitch of commerce and m-dinitrobenzene as oxidizing reagent, the resins being first fully cured at 300° C.:

| Resin No. | Amount of oxidizing reagent used (percent of pitch) | Weight loss (percent of resin fully cured at 300° C.) at— | |
|---|---|---|---|
| | | 350° C. | 450° C. |
| 1 | 17.7 | Nil | 12.1 |
| 2 | 17.7 | Nil | 9.5 |
| 3 | 25.0 | Nil | 5.9 |
| 4 | 17.7 | Nil | 14.8 |
| 5 | 11.1 | Nil | 17.8 |

Similarly the resistance of the resins of this invention to destructive oxidation by air is exceptional. Resistance to air oxidation of any resin varies with its physical form, rate of attack depending primarily on the extent of surface presented to the action of the corrosive agent. Thus, a resin will be attacked most rapidly if it is spread in a thin film on a surface readily accessible to the air. To demonstrate the resistance of the resins of this invention, there was prepared porous formed shapes (blocks ½" x 3" x 1½") by coating particles of filler with fusible form of the resin, compression molding into the desired shape, then completing the cure of the resin by heating at 250° C. in an oven. The cured blocks thus obtained were exposed to air in an oven at 250° C. for several weeks, weight change being determined from time to time. Results were as follows:

| Filler | Weight change (percent of resin content) of fully cured blocks after heating at 250° C. for (days) | | | | | |
|---|---|---|---|---|---|---|
| | 1 | 2 | 9 | 16 | 31 | 60 |
| Silica, approximately 40 mesh | +1.4 | +1.7 | +0.7 | −0.2 | −4.0 | −11.5 |
| Carbon, approximately 200 mesh | +0.5 | +0.4 | +0.9 | +1.5 | +0.7 | −6.6 |

It is thus shown that the resin, even when readily accessible to attack as a film on the surface of filler particles is highly resistant to air oxidation for periods of at least several weeks. It was also observed that the resin of this invention will withstand exposure to air at 350° C. for periods of at least several hours when it is spread in a film of about one mm. thickness.

The resins of this invention also are highly resistant to corrosive attack by chemical agents other than air, for example, caustic solutions, oxidizing acids such as nitric and sulfuric acids and other acids such as acetic, hydrochloric and phosphoric, and solvents such as alcohols, hydrocarbons and ketones. As a method of obtaining a measure of the resistance of these resins to some of these agents, there was used the procedure described by W. H. Adams et al., Chemical Engineering, July 1949, page 85. In this procedure, the resin with or without filler is made into formed pieces, which are then exposed to the action of the test solutions at controlled temperatures. After exposure, resistance ratings are assigned on the basis of specific observations and measurements made on the test pieces and the solutions to which they have been exposed.

In applying the Adams' resistance ratings to the resins of this invention, partially cured resin and a carbon filler were formed into pieces similar to those used for tests of air oxidation resistance discussed above. These were then fully cured at 250° C. and were cut into small test samples approximately ⅜" x ⅜" x ¾", which were used to obtain Adams' ratings. For resistance to nitric acid and sodium hydroxide, average ratings of at least 90 were obtained as follows:

| Reagents | Concentration (percent) | Temp. of test (° C.) | Weight change of sample | Volume change of sample | Appearance of sample | Appearance of solution | Average rating |
|---|---|---|---|---|---|---|---|
| Sodium hydroxide | 20 | 25 | 100 | 98 | 100 | 100 | 99.5 |
| Do | 20 | 100 | 94 | 100 | 100 | 90 | 96.0 |
| Do | 50 | 25 | 100 | 100 | 100 | 100 | 100 |
| Nitric acid | 5 | 25 | 100 | 98 | 100 | 100 | 98.8 |
| Do | 5 | 100 | 88 | 93 | 100 | 95 | 94.0 |
| Do | 10 | 25 | 93 | 93 | 100 | 100 | 97.0 |
| Do | 15 | 25 | 100 | 90 | 100 | 100 | 97.5 |

Thus when the resin of this invention is substantially completely cured, it has an Adams' rating of at least 90 when treated with 20% sodium hydroxide at 100° C. and when treated with 5% nitric acid at 100° C.

Although the invention has been illustrated in connection with certain specific reactions, ingredients and proportions of ingredients, it will be apparent that modifications and changes may be made without departing from the spirit and scope of the invention.

I claim:

1. A partially cured, essentially hydrocarbonaceous resinous material being thermosetting, and solid at 25° C., having a draw point within the range of 175° C. to 275° C. and having 25 to 60% of benzene-soluble components.

2. A partially cured, essentially hydrocarbonaceous resinous material being thermosetting, and solid at 25° C., having a draw point within the range of 200° C. to 260° C. and having 35 to 45% of benzene-soluble components.

3. A molding composition comprising a filler and a partially cured, essentially hydrocarbonaceous resinous material being thermosetting, and solid at 25° C., having a draw point within the range of 175° C. to 275° C. and having 25 to 60% of benzene-soluble components.

4. A molding composition comprising a filler and a partially cured, essentially hydrocarbonaceous resinous material being thermosetting, and solid at 25° C., having a draw point within the range of 200° C. to 260° C. and having 35 to 45% of benzene-soluble components.

5. A molding composition comprising an asbestos filler and a partially cured, essentially hydrocarbonaceous resinous material being thermosetting, and solid at 25° C., having a draw point within the range of 200° C. to 260° C. and having 35 to 45% of benzene-soluble components.

6. A precured thermosetting composition comprising a filler and a partially cured thermosetting, essentially hydrocarbonaceous resinous material, being solid at 25° C., said composition manifesting at 300° C. plasticity when subjected to 500 pounds per square inch pressure and no significant plasticity when subjected to 5 pounds per square inch pressure, and evolving no significant amounts of gaseous products when completely cured.

7. A cured, thermoset, essentially hydrocarbonaceous resinous material, being solid at 25° C., having less than 35% benzene-soluble components, manifesting no fluidity at 375° C., yielding a carbon residue of at least 65% and substantially less than 100% by weight when heated to 950° C. in the absence of oxygen and having an Adams' resistance rating of at least 90 when treated with 20% sodium hydroxide at 100° C.

8. A composition comprising a cured, thermoset, essentially hydrocarbonaceous resinous material and a filler incorporated therein, said resinous material being solid at 25° C., having less than 35% benzene-soluble components, manifesting no fluidity at 375° C., yielding a carbon residue of at least 65% and substantially less than 100% by weight when heated to 950° C. in the absence of oxygen and having an Adams' resistance rating of at least 90 when treated with 20% sodium hydroxide at 100° C.

9. A partially cured, essentially hydrocarbonaceous, resinous material, being thermoplastic and a solid, manifesting no draw point at 275° C., being fusible between the temperatures of 275–400° C., and having 25–60% of benzene-soluble components.

10. A partially cured, essentially hydrocarbonaceous, resinous material, being thermoplastic and containing an insufficient amount of oxidizing agent to become thermoset on heating to elevated temperatures, said resinous material being solid at 25° C., having a draw point within the range of 150–275° C., and having 25–60% of benzene-soluble components.

11. A partially cured, essentially hydrocarbonaceous, resinous material, being thermoplastic, solid at 25° C., having a draw point of 150–275° C., and having also 25–60% of benzene-soluble components.

12. A molding composition, comprising a cellulosic filler and a partially cured, essentially hydrocarbonaceous, resinous material, being thermoplastic and solid at 25° C., having a draw point of 150–275° C., and having also 25–60% of benzene-soluble components.

13. A molding composition, comprising a filler and a partially cured, essentially hydrocarbonaceous, resinous material, being thermoplastic, a solid at 25° C., manifesting no draw point at 275° C., and being fusible between the temperatures of 275–400° C., said resinous material having 25–60% of benzene-soluble components.

14. The process of producing a thermosetting molding composition, comprising mixing a filler and a partially cured, essentially hydrocarbonaceous, resinous material, and heating the resulting mixture to a temperature in the range of 165–400° C. for a period sufficient to effect a further cure of said resinous material but insufficient to convert it to an infusible thermoset resin, said partially cured, hydrocarbonaceous, resinous material being thermosetting and solid at 25° C., having a draw point within the range of 175–275° C., and having 25–60% of benzene-soluble components.

15. The process of producing a thermosetting molding composition, comprising mixing a filler and a partially cured, essentially hydrocarbonaceous, resinous material, and heating the resulting mixture to a temperature above the draw point of said resinous material to cause said resinous material to flow, but without converting said resinous material to an infusible thermoset resin, said partially cured, hydrocarbonaceous material being thermosetting and solid at 25° C., having a draw point within the range of 175–275° C., and having 25–60% of benzene-soluble components.

16. The process of producing a thermosetting molding composition, comprising mixing a filler and a partially cured, essentially hydrocarbonaceous, resinous material, heating the resulting mixture to a temperature within the range of the temperature of the draw point of said resinous material and 400° C. to cause the resinous material to flow, and continuing said heating for a period sufficient to increase substantially the cure of said resinous material to an extent that it may be later completely cured without significant evolution of gas, said heatings being conducted without converting said resinous material to an infusible thermoset resin; and said partially cured, hydrocarbonaceous material being thermosetting and solid at 25° C., having a draw point within the range of 175–275° C., and having 25–60% of benzene-soluble components.

17. The process of producing a hydrocarbonaceous resin, which comprises mixing a hydrocarbonaceous pitch with 7.5–25% by weight of a dinitrobenzene, heating said mixture at a temperature within the range of 165–400° C. for a time sufficient to obtain a reaction mixture having a draw point within the range of 175–275° C. and containing 25–60% of benzene-soluble components, said hydrocarbonaceous pitch having a specific gravity of at least 1.02 at 25° C., yielding at least 60% of a solid material based upon the weight of said pitch upon heating said pitch for 72 hours at 450° C. in a closed vessel where distillation is not possible and said resulting solid material, when heated to 950° C. at atmospheric pressure in the absence of oxygen, yielding a carbon residue amounting to at least 80% of said solid material, and terminating said heating at a temperature below 400° C.

18. The process of producing a thermoset resinous composition, which comprises heating a partially cured, essentially hydrocarbonaceous, resinous material at a temperature above 275° C. but not substantially above 325° C., continuing heating said material within said range for a time sufficient to convert said material into a thermoset resin which does not manifest fluidity when heated to 375° C., said partially cured resinous material subjected to said heating being solid at 25° C., thermosetting, having a draw point of 200–260° C., and having 34–45% of benzene-soluble components, and terminating said heating at a temperature not substantially in excess of 325° C.

19. The process of producing a hydrocarbonaceous resin, which comprises mixing a hydrocarbonaceous pitch with an oxidizing agent selected from the group consisting of solid and liquid oxidizing agents, heating said mixture at a temperature within the range of 165–400° C. for a time sufficient to obtain a reaction product having a draw point within the range of 150–275° C., said hydrocarbonaceous pitch having a specific gravity of at least 1.02 at 25° C., yielding at least 60% of a solid material based upon the weight of said pitch upon heating said pitch for 72 hours at 450° C. in a closed vessel where distillation is not possible, and said resulting solid material, when heated to 950° C. at atmospheric pressure in the absence of oxygen, yielding a carbon residue amounting to at least 80% of said solid material, and terminating said heating at a temperature below 400° C.

20. The process of claim 19 in which the amount of oxidizing agent is insufficient to bring about complete curing on heating above 275° C.

21. The process of producing a molded product, which comprises mixing a cellulosic filler and a partially cured, essentially hydrocarbonaceous resinous material, said partially cured, essentially hydrocarbonaceous, resinous material being thermoplastic, solid at 25° C., having a draw point of 150–165° C., and having also 25% to 60% of benzene-soluble components, heating the resulting mixture at a temperature in the range of 150–175° C. to cause said resinous material to flow, terminating said heating at a temperature below 175° C., and subjecting the mixture to super-atmospheric pressure to produce a formed object.

22. The process of producing a hydrocarbonaceous resin, which comprises mixing a hydrocarbonaceous pitch with an oxidizing agent selected from the group consisting of solid and liquid oxidizing agents, heating said mixture at a temperature within the range of 165–400° C. for a time sufficient to obtain a reaction product having a draw point within the range of 175–275° C., said hydrocarbonaceous pitch having a specific gravity of at least 1.02 at 25° C., yielding at least 60% of a solid material based upon the weight of said pitch upon heating said pitch for 72 hours at 450° C. in a closed vessel where distillation is not possible, and said resulting solid material, when heated to 950° C. at atmospheric pressure in the absence of oxygen, yielding a carbon residue amounting to at least 80% of said solid material, and terminating said heating at a temperature below 400° C.

23. The process of producing a hydrocarbonaceous resin, which comprises mixing a hydrocarbonaceous pitch with an oxidizing agent selected from the group consisting of solid and liquid oxidizing agents, heating said mixture at a temperature within the range of 185–250° C. for a time sufficient to obtain a reaction mixture having a draw point within the range of 200–260° C., said hydrocarbonaceous pitch having a specific gravity of at least 1.02 at 25° C., yielding at least 60% of a solid material based upon the weight of said pitch upon heating said pitch for 72 hours at 450° C. in a closed vessel where distillation is not possible, and said resulting solid material, when heated to 950° C. at atmospheric pressure in the absence of oxygen, yielding a carbon residue amounting to at least 80% of said solid material, and terminating said heating at a temperature below 250° C.

24. The process of producing a hydrocarbonaceous resin, which comprises mixing a hydrocarbonaceous pitch with an oxidizing agent selected from the group consisting of solid and liquid oxidizing agents, heating said mixture to a temperature within the range of 165–275° C. without excessive foaming thereof, continuing said heating over a period of hours until the rate of cure of the mixture decreases upon further heating and until the reacted product has a draw point of 150–275° C., said hydrocarbonaceous pitch having a specific gravity of at least 1.02 at 25° C., yielding at least 60% of a solid material based upon the weight of said pitch upon heating said pitch for 72 hours at 450° C. in a closed vessel where distillation is not possible and said resulting solid material, when heated to 950° C. at atmospheric pressure in the absence of oxygen, yielding a carbon residue amounting to at least 80% of said solid material, and terminating said heating at a temperature below 275° C.

25. The process of producing a partially cured thermosetting resin, which comprises mixing a hydrocarbonaceous pitch with an oxidizing agent selected from the group consisting of solid and liquid oxidizing agents, heating and gradually increasing the temperature of the mixture to a temperature within the range of 165–275° C., the rate of increasing said temperature being sufficiently slow to insure avoiding excessive foaming, continuing said heating for a period of time until the rate of increase of the draw point of the reaction product is less than 3° C. per hour while the temperature is maintained substantially constant and until the draw point of the reaction product is in the range of 150–275° C., said hydrocarbonaceous pitch having a specific gravity of at least 1.02 at 25° C., yielding at least 60% of a solid material based upon the weight of said pitch upon heating said pitch for 72 hours at 450° C. in a closed vessel where distillation is not possible and said resulting solid material, when heated to 950° C. at atmospheric pressure in the absence of oxygen, yielding a carbon residue amounting to at least 80% of said solid material, and terminating said heating at a temperature below 275° C.

26. The process of producing a partially cured thermosetting resin, which comprises heating a hydrocarbonaceous pitch with a polynitrobenzene at a progressively increasing temperature, starting at 165–180° C. and going to temperatures within the range of 200–250° C., said temperature being increased sufficiently slowly to avoid excessive foaming of the reaction mixture, continuing said heating for a period of time until the rate of increase of the draw point of the reaction product is less than 3° C. per hour while the temperature is maintained substantially constant and until the reaction product has a draw point in the range of 150–275° C., said hydrocarbonaceous pitch having a specific gravity of at least 1.02 at 25° C., yielding at least 60% of a solid material based upon the weight of said pitch upon heating said pitch for 72 hours at 450° C. in a closed vessel where distillation is not possible and said resulting solid material, when heated to 950° C. at atmospheric pressure in the absence of oxygen, yielding a carbon residue amounting to at least 80% of said solid material, and terminating said heating at a temperature below 250° C.

27. The process of producing a hydrocarbonaceous resin which comprises heating a hydrocarbonaceous pitch with 7.5-25% by weight of a dinitrobenzene at progressively increasing temperatures, starting at 165-180° C. and going to temperatures within the range of 200-250° C., said temperature being increased sufficiently slowly to avoid excessive foaming of the reaction mixture, continuing said heating for a time sufficient to bring the draw point of the reaction product within the range of 175-275° C., said hydrocarbonaceous pitch having a specific gravity of at least 1.02 at 25° C., yielding at least 60% of a solid material based upon the weight of said pitch upon heating said pitch for 72 hours at 450° C. in a closed vessel where distillation is not possible and said resulting solid material, when heated to 950° C. at atmospheric pressure in the absence of oxygen, yielding a carbon residue amounting to at least 80% of said solid material, and terminating said heating at a temperature below 250° C.

28. The process of producing a partially cured thermosetting resin, which comprises heating a hydrocarbonaceous pitch with 14% to 20% by weight of a dinitrobenzene at progressively increasing temperatures, starting at 165-180° C. and going to temperatures within the range of 200-250° C., said temperature being increased sufficiently slowly to avoid excessive foaming of the reaction mixture, continuing said heating for a period of time to bring the draw point of the reaction product within the range of 175-275° C., said hydrocarbonaceous pitch having a specific gravity of at least 1.02 at 25° C., yielding at least 60% of a solid material based upon the weight of said pitch upon heating said pitch for 72 hours at 450° C. in a closed vessel where distillation is not possible and said resulting solid material, when heated to 950° C. at atmospheric pressure in the absence of oxygen, yielding a carbon residue amounting to at least 80% of said solid material, and terminating said heating at a temperature below 250° C.

29. The process of producing a partially cured thermosetting resin, which comprises heating a hydrocarbonaceous pitch with m-dinitrobenzene at progressively increasing temperatures, starting at about 185° C. and going to temperatures within the range of 200-225° C., said temperature being increased at a rate sufficiently slowly to avoid excessive foaming and continuing said heating for a period of time sufficient to bring the draw point of the reaction product within the range of 200-260° C., said hydrocarbonaceous pitch having a specific gravity of at least 1.02 at 25° C., yielding at least 60% of a solid material based upon the weight of said pitch upon heating said pitch for 72 hours at 450° C. in a closed vessel where distillation is not possible and said resulting solid material, when heated to 950° C. at atmospheric pressure in the absence of oxygen, yielding a carbon residue amounting to at least 80% of said solid material, and terminating said heating at a temperature below 225° C.

30. The process of producing a thermoset resinous composition, which comprises mixing with an oxidating agent selected from the group consisting of solid and liquid oxidizing agents a hydrocarbonaceous pitch having a specific gravity of at least 1.02 at 25° C., yielding at least 60% of a solid material based upon the weight of said pitch when said pitch is heated for 72 hours at 450° C. in a closed vessel where distillation is not possible and said resulting solid material, when heated to 950° C. at atmospheric pressure in the absence of oxygen, yielding a carbon residue amounting to at least 80% of said solid material, heating said mixture of oxidizing agent and said hydrocarbonaceous pitch above 165° C. but not above 400° C. for a time sufficient to convert said material into a thermoset resin product which does not manifest fluidity when heated to 375° C., and terminating said heating at a temperature below 400° C.

31. The process of claim 30 in which said carbonaceous pitch is coal tar pitch.

32. The process of claim 30 in which the heating operation is carried out in two separate stages and in the first stage of which the heating is continued within said range of 165-400° C. until a thermosetting resinous reaction product is obtained having a draw point within the range of 175-275° C., being solid at 25° C. and having 25-60% of benzene-soluble components, and in which the second stage comprises heating said thermosetting product within said range until said product does not manifest fluidity at 375° C.

33. The process of producing a thermoset resinous composition, which comprises mixing with an oxidizing agent selected from the group consisting of solid and liquid oxidizing agents a hydrocarbonaceous pitch having a specific gravity of at least 1.02 at 25° C., yielding at least 60% of a solid material based upon the weight of said pitch when said pitch is heated for 72 hours at 450° C. in a closed vessel where distillation is not possible and said resulting solid material, when heated to 950° C. at atmospheric pressure in the absence of oxygen, yielding a carbon residue amounting to at least 80% of said solid material, heating said mixture of said hydrocarbonaceous pitch and oxidizing agent within the range of 165-275° C. without excess foaming thereof, continuing said heating until the rate of cure decreases upon further heating and until the draw point is between 150° and 275° C., further heating the same above 165° C. but not above 400° C. for a time sufficient to convert the same into a reaction product which does not manifest fluidity at 375° C., and terminating said last-mentioned heating at a temperature below 400° C.

34. The process of obtaining a thermoset resinous composition, which comprises mixing with an oxidizing agent selected from the group consisting of solid and liquid oxidizing agents a hydrocarbonaceous pitch having a specific gravity of at least 1.02 at 25° C., yielding at least 60% of a solid material based upon the weight of said pitch when said pitch is heated for 72 hours at 450° C. in a closed vessel where distillation is not possible, and said resulting solid material, when heated to 950° C. at atmospheric pressure in the absence of oxygen, yielding a carbon residue amounting to at least 80% of said solid material, and heating said mixture of oxidizing agent and pitch to a temperature within the range of 165-275° C., the rate of increasing said temperature being sufficiently slow to avoid excessive foaming, continuing said heating until the rate of increase of the draw point of the reaction product is less than 3° per hour while the temperature is maintained substantially constant and until the draw point is in the range of 150-275° C., further heating the resulting material at a temperature above 275° C. but not above 325° C. for a time sufficient to convert it into a substantially infusible thermoset resinous composition which does not manifest fluidity at 375° C., terminating said last-mentioned heating at a temperature below 325° C. and recovering said resinous composition.

35. The process of producing a thermoset resinous composition, which comprises mixing a hydrocarbonaceous pitch with an oxidizing agent selected from the group consisting of solid and liquid oxidizing agents, heating and gradually increasing the temperature of the mixture to a temperature within the range of 165-275° C., the rate of increasing said temperature being sufficiently slow to insure avoiding excess foaming, continuing said heating at a substantially constant temperature until the rate of increase of the draw point of the reaction product is less than 3° per hour while the temperature is maintained substantially constant and until the draw point is within the range of 150-275° C., further heating the resulting material at about 300° C. for a time sufficient to convert it into a substantially infusible thermoset resinous composition, and terminating said last-mentioned heating at a temperature below about 300° C. and recovering said thermoset composition, said hydrocarbonaceous pitch subjected to said heating having a specific gravity of at least 1.02 at 25° C., yielding at least 60% of a solid material based upon the the weight of said pitch when said pitch is heated for 72 hours at 450° C. in a closed vessel where distillation is not possible and said resulting solid material, when heated to 950° C. at atmospheric pressure in the absence of oxygen, yielding a carbon residue amounting to at least 80% of said solid material.

36. The process of producing a hydrocarbonaceous resin, which comprises mixing a hydrocarbonaceous pitch with an oxidizing agent selected from the group consisting of solid and liquid oxidizing agents, heating said mixture at a temperature within the range of 165–400° C. for a predetermined period until the reaction product has a draw point within the range of 150–275° C. and contains 25–60% of benzene-soluble components, said hydrocarbonaceous pitch having a specific gravity of at least 1.02 at 25° C., yielding at least 60% of a solid material based upon the weight of said pitch upon heating said pitch for 72 hours at 450° C. in a closed vessel where distillation is not possible and said resulting solid material, when heated to 950° C. at atmospheric pressure in the absence of oxygen, yielding a carbon residue amounting to at least 80% of said solid material, and terminating said heating at a temperature below 400° C.

37. The process of claim 36 in which a filler is incorporated in the reaction mixture.

38. A process of producing a thermoplastic and non-thermosetting, hydrocarbonaceous resin, which comprises mixing a hydrocarbonaceous pitch with an oxidizing agent selected from the group consisting of solid and liquid oxidizing agents, the amount of said oxidizing agent being insufficient to bring about complete cure on heating, heating said mixture at a temperature within the range of 165–400° C. until the product manifests no draw point at 275° C. but is fusible between the temperatures of 275–400° C., said hydrocarbonaceous pitch having a specific gravity of at least 1.02 at 25° C., yielding at least 60% of a solid material based upon the weight of said pitch upon heating said pitch for 72 hours at 450° C. in a closed vessel where distillation is not possible and said resulting solid material, when heated to 950° C. at atmospheric pressure in the absence of oxygen, yielding a carbon residue amounting to at least 80% of said solid material, and terminating said heating at a temperature below 400° C.

39. The process of producing a thermoplastic, hydrocarbonaceous resin, which comprises mixing a hydrocarbonaceous pitch with an oxidizing agent selected from the group consisting of solid and liquid oxidizing agents, heating said mixture at a temperature within the range of 165–400° C. for a period of time sufficient to react the pitch and oxidizing agent and until the product manifests no draw point at 275° C. but is fusible between the temperatures of 275–400° C., said hydrocarbonaceous pitch having a specific gravity of at least 1.02 at 25° C., yielding at least 60% of a solid material based upon the weight of said pitch upon heating said pitch for 72 hours at 450° C. in a closed vessel where distillation is not possible and said resulting solid material, when heated to 950° C. at atmospheric pressure in the absence of oxygen, yielding a carbon residue amounting to at least 80% of said solid material, and terminating said heating at a temperature below 400° C.

40. The process of producing a thermoset resinous composition, which comprises heating a partially cured, essentially hydrocarbonaceous, resinous material having a draw point in the range of 175–275° C. to a temperature above 165° C. but not substantially above 400° C., continuing heating said material within said range for a time sufficient to convert said material into a substantially infusible thermoset resin which does not manifest fluidity at 375° C., terminating said heating at a temperature below 400° C. and recovering said resin, said partially cured, resinous material subjected to said heating being solid at 25° C., having a draw point within the range of 175–275° C., being thermosetting, and having 25–60% of benzene-soluble components.

41. The process of claim 40 in which said material is heated within the range of 250–350° C. and the heating is terminated at a temperature not in excess of 350° C.

42. The process of producing a thermoset resinous composition, which comprises heating a partially cured, essentially hydrocarbonaceous, resinous material having a draw point of 200–260° C. to about 300° C., continuing heating said material at about 300° C. for a time sufficient to convert said material into an insoluble thermoset resin which does not manifest fluidity at 375° C., and discontinuing said heating at a temperature below about 300° C., and as soon as said material ceases to manifest fluidity, said partially cured resinous material subjected to said heating being solid at 25° C., being thermosetting, having a draw point of 200–260° C., and having 35–45% benzene-soluble components.

43. The process of producing a thermoset resinous composition, which comprises mixing a filler with a partially cured, essentially hydrocarbonaceous resinous material, heating said mixture at a temperature between 250° and 350° C., continuing heating said mixture for a time sufficient to convert it into a substantially infusible thermoset resin which does not manifest fluidity at 375° C., and terminating said heating at a temperature of not to exceed 300° C., and recovering said resin, said partially cured resinous material subjected to said heating being thermosetting and solid at 25° C., having a draw point within the range of 175–275° C., and having 25–60% of benzene-soluble components.

44. The process of producing a thermoset resinous composition, which comprises heating and subjecting a molding compound containing a partially-cured, essentially hydrocarbonaceous, resinous material to super-atmospheric pressures at a temperature between 250° and 350° C. for a time sufficient to convert said partially-cured, resinous material into a substantially infusible thermoset resin which does not manifest fluidity at 375° C., and terminating said heating at a temperature of not to exceed 350° C. and recovering said resin, said partially-cured resinous material subjected to said heating being thermosetting, solid at 25° C., having a draw point within the range of 175–275° C., and having 25–60% of benzene-soluble components.

45. The process of producing a thermoset resinous composition, which comprises heating and subjecting a molding compound containing a partially-cured, essentially hydrocarbonaceous, resinous material to super-atmospheric pressures at a temperature between 275° and 325° C. for a time sufficient to convert said partially-cured resinous material into a substantially infusible thermoset resin which does not manifest fluidity at 375° C., terminating said heating at a temperature below 325° C., and recovering said resin, said partially-cured resinous material subjected to said heating being thermosetting, solid at 25° C., having a draw point of 200–260° C., and having 35–45% of benzene-soluble components.

46. The process of producing a theromset resinous composition, which comprises heating and subjecting a molding composition containing a partially-cured, essentially hydrocarbonaceous, resinous material to super-atmospheric pressures at about 300° C. for a time sufficient to convert said partially-cured resinous material into a substantially infusible resin which does not manifest fluidity at 375° C., and terminating said heating at a temperature below 300° C. and recovering said resin, said partially-cured resinous material subjected to said heating being thermosetting, solid at 25° C., having a draw point of 200–260° C., and having 35–45% of benzene-soluble components.

47. In a process for producing a thermosetting composition, the steps which comprise heating and completely curing a molding composition containing a filler and a pre-cured, essentially hydrocarbonaceous, resinous material at a lower temperature than that at which said resin was pre-cured and for a time sufficient to convert said composition into a completely cured resin composition which does not manifest fluidity at 375° C., and terminating said curing at a temperature below 400° C., said pre-cured composition subjected to said heating having been cured at a temperature below 400° C. and above 200° C. and being solid at 25° C., having a draw point within the range of 150–275° C., manifesting at 300° C. plasticity when subjected to 500 pounds per square inch pressure and no significant plasticity when subjected to 5 pounds per square inch pressure and evolving no significant amount of gaseous products when completely cured.

48. The process of producing a theromset composition, which comprises heating at a temperature between 250° and 350° C. a pre-cured thermosetting composition containing a filler and a partially-cured, essentially hydrocarbonaceous, thermosetting resinous material, continuing heating said composition for a time sufficient to convert said pre-cured resinous material into a substantially infusible thermoset resin which does not manifest fluidity at 375° C., terminating said heating at a temperature below 350° C., and recovering said resin, said pre-cured composition subjected to said heating being solid at 25° C., having a draw point within the range of 150–275° C., manifesting at 300° C. a plasticity when subjected to 500 pounds per square inch pressure and no significant plasticity when subjected to 5 pounds per square inch pressure, and evolving no significant amounts of gaseous products when completely cured.

49. The process of producing a thermoset composition, which comprises mixing a filler and a partially-cured, essentially hydrocarbonaceous, resinous material, heating the resulting mixture to a temperature between 165° and 400° C. to cause said resinous material to flow but without converting said resinous material to an infusible thermoset resin, and heating the resulting product for a time sufficient to effect its substantially complete cure so that it does not manifest fluidity at 375° C., terminating said last-mentioned heating at a temperature below 400° C. and recovering said resin, said partially-cured, essentially hydrocarbonaceous, resinous material subjected to said heating being thermosetting, solid at 25° C., having a draw point within the range of 175–275° C., and having 25–60% of benzene-soluble components.

50. The process of producing a thermoset composition, which comprises mixing a filler and a partially-cured, essentially hydrocarbonaceous, resinous material, heating the resulting mixture to a temperature within the range of the draw point of said resinous material to cause the resinous material to flow about said filler while also precuring the mixture by heating for a time sufficient to increase substantially the cure of said resinous material and to reduce volatile material significantly, further heating the resulting composition at a lower temperature than that of the pre-cure heating for a time sufficient to convert it into a substantially infusible thermoset composition which does not manifest fluidity at 375° C., said partially cured, essentially hydrocarbonaceous material subjected to said heating being thermosetting, solid at 25° C., having a draw point within the range of 175–275° C., and having 25–60% of benzene-soluble components, and terminating said last-mentioned heating.

References Cited in the file of this patent

UNITED STATES PATENTS

| | | |
|---|---|---|
| 2,299,469 | D'Antal | Oct. 20, 1942 |
| 2,478,654 | Croyere | Aug. 9, 1949 |
| 2,500,208 | Shea et al. | Mar. 14, 1950 |
| 2,527,569 | Shea et al. | Oct. 31, 1950 |
| 2,560,650 | Kronstein | July 17, 1951 |